(12) United States Patent
Gill et al.

(10) Patent No.: US 11,416,566 B2
(45) Date of Patent: Aug. 16, 2022

(54) METHODS AND SYSTEMS FOR DETERMINING MEDIA CONTENT TO DOWNLOAD

(71) Applicant: Rovi Guides, Inc., Santa Clara, CA (US)

(72) Inventors: Daren Gill, Concord, MA (US); Abubakkar Siddiq, Methuen, MA (US); Ahmed Nizam Mohaideen P, Kovilpatti, IN (US); Sankar Ardhanari, Windham, NH (US); China Karnati, Bangalore (IN); Sashikumar Venkataraman, Andover, MA (US)

(73) Assignee: Rovi Guides, Inc., San Jose, CA (US)

( * ) Notice: Subject to any disclaimer, the term of this patent is extended or adjusted under 35 U.S.C. 154(b) by 544 days.

(21) Appl. No.: 14/673,025

(22) Filed: Mar. 30, 2015

(65) Prior Publication Data

US 2016/0188728 A1 Jun. 30, 2016

Related U.S. Application Data

(60) Provisional application No. 62/099,038, filed on Dec. 31, 2014.

(51) Int. Cl.
*G06F 16/00* (2019.01)
*G06F 16/9535* (2019.01)
(Continued)

(52) U.S. Cl.
CPC .... *G06F 16/9535* (2019.01); *G06F 16/24575* (2019.01); *G06F 16/24578* (2019.01); *G06F 16/435* (2019.01); *G06F 16/955* (2019.01); *H04L 67/06* (2013.01); *H04L 67/10* (2013.01); *H04L 67/306* (2013.01)

(58) Field of Classification Search
CPC .......... G06F 16/9535; G06F 16/24575; G06F 16/24578; G06F 16/435; G06F 16/955; H04L 67/06; H04L 67/10; H04L 67/306
See application file for complete search history.

(56) References Cited

U.S. PATENT DOCUMENTS 6,239,794 B1  5/2001  Yuen
6,388,714 B1  5/2002  Schein
(Continued)

FOREIGN PATENT DOCUMENTS

WO  WO 2014/035801  3/2014

*Primary Examiner* — Neveen Abel Jalil
*Assistant Examiner* — Paul Kim
(74) *Attorney, Agent, or Firm* — Haley Guiliano LLP

(57) ABSTRACT

Methods and systems are described for a media guidance application that tailors media content recommendations for downloadable content to the current interests of the users. For example, the media guidance application may determine the current interests of a user based on the media content recently consumed by the friends of the user, and automatically download that media content. In such cases, the media guidance application may monitor social networks of the user for indications of media content that may have been recently consumed by the friends of a user as such media content is likely to be of current interest to the user. In response to detecting media content that was recently consumed by the friend of the user, the media guidance application may automatically download the media content to a device of the user.

20 Claims, 4 Drawing Sheets

(51) Int. Cl.
  *H04L 67/306* (2022.01)
  *H04L 67/10* (2022.01)
  *G06F 16/435* (2019.01)
  *G06F 16/955* (2019.01)
  *G06F 16/2457* (2019.01)
  *H04L 67/06* (2022.01)

(56) References Cited

U.S. PATENT DOCUMENTS

| | | | |
|---|---|---|---|
| 6,564,378 | B1 | 5/2003 | Satterfield |
| 6,756,997 | B1 | 6/2004 | Ward |
| 7,165,098 | B1 | 1/2007 | Boyer |
| 7,761,892 | B2 | 7/2010 | Ellis |
| 8,046,801 | B2 | 10/2011 | Ellis |
| 8,271,413 | B2 | 9/2012 | Agarwal et al. |
| 9,009,265 | B2 | 4/2015 | Zapata et al. |
| 9,258,264 | B1 * | 2/2016 | Shoham ................ G06Q 50/01 |
| 9,754,292 | B1 * | 9/2017 | Pattan ................ G06Q 30/0271 |
| 2002/0174430 | A1 | 11/2002 | Ellis et al. |
| 2003/0110499 | A1 | 6/2003 | Knudson et al. |
| 2005/0251827 | A1 | 11/2005 | Ellis et al. |
| 2009/0083362 | A1 * | 3/2009 | Svendsen .......... G06F 17/30017 709/201 |
| 2009/0282020 | A1 * | 11/2009 | McSheffrey ........ G06F 17/3002 |
| 2010/0153885 | A1 | 6/2010 | Yates |
| 2010/0333137 | A1 | 12/2010 | Hamano et al. |
| 2011/0029620 | A1 * | 2/2011 | Bonforte ............... H04L 67/306 709/206 |
| 2013/0110848 | A1 * | 5/2013 | Svendsen .............. G06F 16/435 707/748 |
| 2013/0311597 | A1 | 11/2013 | Arrouye et al. |
| 2013/0339276 | A1 * | 12/2013 | Lai ...................... G06Q 10/107 706/12 |
| 2014/0149425 | A1 * | 5/2014 | Kalmes ................ G06F 16/435 707/748 |
| 2015/0293916 | A1 * | 10/2015 | Paglia ............... G06F 17/30029 707/740 |
| 2016/0140605 | A1 * | 5/2016 | Develin ............. G06Q 30/0246 705/14.45 |

* cited by examiner

500

```
┌─────────────────────────────────────────────────┐
│ Determine media assets available for download    │
│ to a first device in which the first device is   │  502
│ related to a first user                          │
└─────────────────────────────────────────────────┘
                      │
                      ▼
┌─────────────────────────────────────────────────┐
│ Retrieve a first user profile on the first       │
│ device, in which the first user profile          │  504
│ indicates a second user related to the first     │
│ user                                             │
└─────────────────────────────────────────────────┘
                      │
                      ▼
┌─────────────────────────────────────────────────┐
│ Monitor a second user profile, in which the      │
│ second user profile indicates a plurality of     │  506
│ media assets recently consumed by the second     │
│ user                                             │
└─────────────────────────────────────────────────┘
                      │
                      ▼
┌─────────────────────────────────────────────────┐
│ Determine whether to download a media asset of   │
│ the media assets available for download based    │
│ on whether the media asset corresponds to one    │  508
│ of the plurality of media assets recently        │
│ consumed by the second user                      │
└─────────────────────────────────────────────────┘
                      │
                      ▼
┌─────────────────────────────────────────────────┐
│ Download the media asset to the first device in  │
│ response to determining that the media asset     │
│ corresponds to the one of the plurality of       │  510
│ media assets recently consumed by the second     │
│ user                                             │
└─────────────────────────────────────────────────┘
```

FIG. 5

METHODS AND SYSTEMS FOR DETERMINING MEDIA CONTENT TO DOWNLOAD

CROSS-REFERENCE TO RELATED APPLICATION

This application claims the benefit of U.S. Provisional Application 62/099,038, filed Dec. 31, 2014, which is hereby incorporated by reference herein in its entirety.

BACKGROUND

In conventional systems, users typically have access to a plethora of downloadable media content. Despite having access to so much downloadable media content, users are often unable to decide what to download. While some conventional systems may offer recommendations, these recommendations are usually not tailored to the current interests of the users.

SUMMARY

Accordingly, methods and systems are described herein for a media guidance application that tailors media content recommendations for downloadable content to the current interests of the users. For example, the media guidance application may determine the current interests of a user based on the media content recently consumed by the friends of the user, and automatically download that media content. In such cases, the media guidance application may monitor social networks of the user for indications of media content that may have been recently consumed by the friends of a user as such media content is likely to be of current interest to the user. In response to detecting media content that was recently consumed by the friend of the user, the media guidance application may automatically download the media content to a device of the user.

In some aspects, the media guidance application may determine media assets available for download to a first device, in which the first device is related to a first user. For example, the media guidance application may compile a listing of the downloadable media content available through the content sources of the first user.

The media guidance application may retrieve a first user profile on the first device, in which the first user profile indicates a second user related to the first user. For example, the media guidance application may retrieve a social network profile of a user. The social network profile of the user may indicate a group of related social network profiles (e.g., associated with "friends" of the user).

The media guidance application may monitor a second user profile, in which the second user profile indicates a plurality of media assets recently consumed by the second user. For example, the media guidance application may monitor social network content associated with a friend of the user for indications of media content recently consumed by the friend. In another example, the media guidance application may monitor a viewing history (e.g., associated with a particular content source) of the other user profile.

The media guidance application may determine whether to download a media asset of the media assets available for download based on whether or not the media asset corresponds to one of the plurality of media assets recently consumed by the second user. For example, the media guidance application may determine which available media assets were recently consumed by a friend of the user.

The media guidance application may then download the media asset to the first device in response to determining that the media asset corresponds to the one of the plurality of media assets recently consumed by the second user. For example, in response to determining that an available media asset was recently consumed by a friend of the user, the media guidance application may automatically download the media asset to the device of the user.

In some embodiments, the media guidance application may further determine a priority for downloading the media asset. For example, the priority may be based on a number of users that have consumed the media asset. In another example, the priority may be based on how recently the second user consumed the media asset. In yet another example, the priority may be based on the cost of the media asset.

In some embodiments, the media guidance application may determine whether or not the first user has consumed the media asset and in response to determining that the first user has consumed the media asset, not download the media asset to the first device. For example, the media guidance application may not download a media asset that the user has already consumed, despite another user recently consuming the media asset.

In some embodiments, the media guidance application may determine what media assets to download and/or what other user profiles to monitor based on one or more criteria. For example, the media guidance application may determine whether or not to monitor a second user profile based on a level of electronic communication between the first user and the second user. In another example, the media guidance application may determine whether or not to download a media asset only if a second user consumed the media asset within a predetermined amount of time.

It should be noted, the systems and/or methods described above may be combined with, applied to, or used in accordance with, other systems, methods and/or apparatuses discussed both above and below.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 is a flowchart of illustrative steps for determining media assets to download to a user device in accordance with some embodiments of the disclosure.

DETAILED DESCRIPTION OF DRAWINGS

Figure 1:
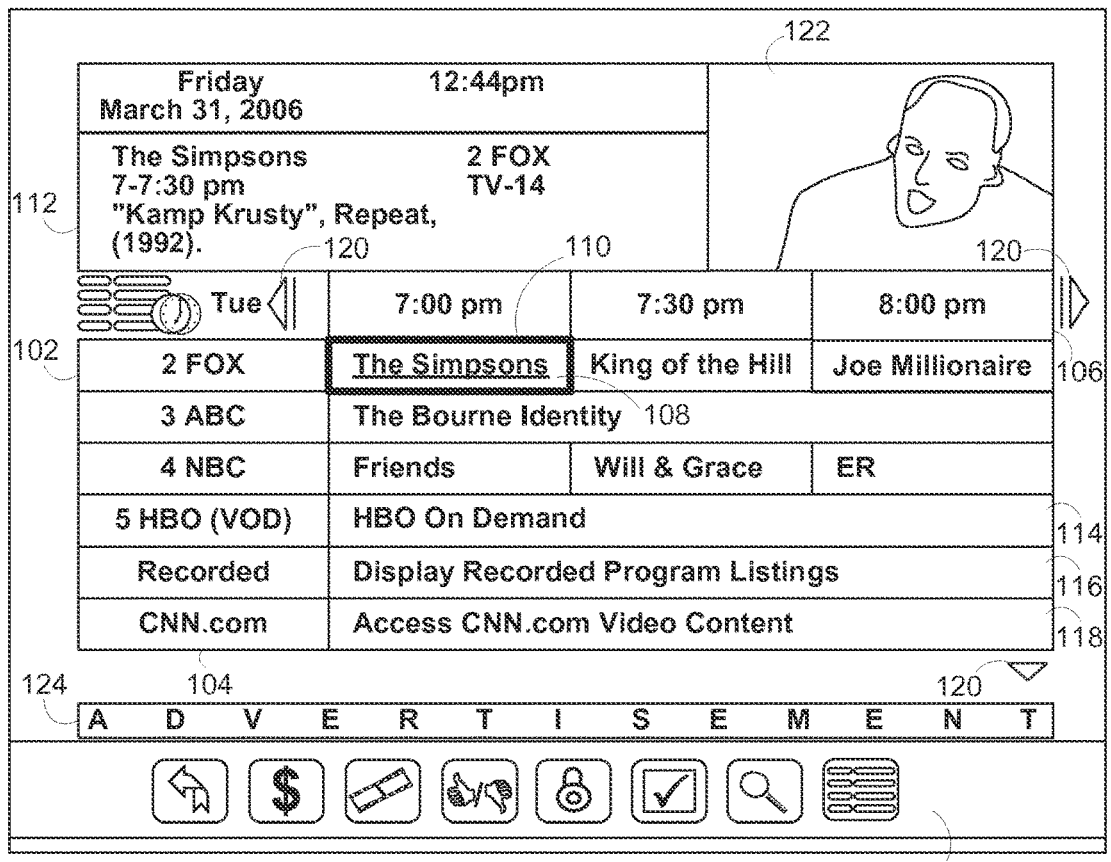
FIG. 1 shows an illustrative example of a media guidance display that may be presented in accordance with some embodiments of the disclosure.

Methods and systems are described herein for a media guidance application that tailors media content recommendations for downloadable content to the current interests of the users. For example, the media guidance application may determine the current interests of a user based on media content recently consumed by the friends of the user, and automatically download that media content. In such cases, the media guidance application may monitor social networks of the user for indications of media content that may have been recently consumed by the friends of a user as such media content is likely to be of current interest to the user. In response to detecting media content that was recently consumed by the friend of the user, the media guidance application may automatically download the media content to a device of the user.

As referred to herein, a "media guidance application" is a media guidance application that allows a user to access media content through an interface. Media guidance applications may take various forms depending on the content for which they provide guidance. One typical type of media guidance application is an interactive television program guide. Interactive television program guides (sometimes referred to as electronic program guides) are well-known media guidance applications that, among other things, allow users to navigate among and locate many types of content or media assets. Interactive media guidance applications may generate graphical user interface screens that enable a user to navigate among, locate and select content.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, web sites, articles, books, electronic books, blogs, advertisements, chat sessions, social media, media guidance applications, games, and/or any other media or multimedia and/or combination of the same. Media guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

In some embodiments, the media guidance application may determine media assets available for download to a first device, in which the first device is related to a first user. For example, the media guidance application may compile a listing of downloadable media content available through the content sources of the first user. The media assets available for download may depend on the content sources of the first user, the limitations of the first device, and/or criterion set by the first user. In contrast, media assets not able to be accessed by the first device due to a limitation such as format, resolution, or file size may not be considered as available to download to the first device. Likewise, media assets that do not fit a criterion set by the first user such as specific genres or ratings may not be considered as available to download to the first device.

It should be noted that a content source can be understood to mean any source of media assets to which the first user has subscribed or otherwise been provided access. This includes cable subscriptions and online services with which the user has an account. For example, a content source may include one or more types of content distribution equipment including a television distribution facility, cable system head end, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. A content source may be the originator of content (e.g., a television broadcaster, a Webcast provider, etc.) or may not be the originator of content (e.g., an on-demand content provider, an Internet provider of content of broadcast programs for downloading, etc.). A content source may include cable sources, satellite providers, on-demand providers, Internet providers, over-the-top content providers, or other providers of content. A content source may also include a remote media server used to store different types of content (including video content selected by a user), in a location remote from any of the user equipment devices. Systems and methods for remote storage of content, and providing remotely stored content to user equipment, are discussed in greater detail in connection with Ellis et al., U.S. Pat. No. 7,761,892, issued Jul. 20, 2010, which is hereby incorporated by reference herein in its entirety.

The media guidance application may download content to one or more devices. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front-facing screen and a rear-facing screen, multiple front screens, or multiple angled screens. In some embodiments, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as online media guidance applications (i.e., provided on a web-site), or as stand-alone media guidance applications or clients on user equipment devices. Various devices and platforms that may implement media guidance applications are described in more detail below.

The media guidance application may retrieve a first user profile on the first device, in which the first user profile indicates a second user related to the first user. As referred to herein, a "user profile" is a collection of data about a user. This profile may be associated with a social network, web site, service provider, email account, or content source. The profile may include a history of activity of the user. The history may include activity of the user on the site associated with the profile. The profile may indicate other users that have a relationship with the user. Activity may include communications of the user with other users and/or content consumed and/or created by the user using the profile. The history may be a recording of the activity (e.g., a viewing history) of the user or can be information provided by the user.

In some embodiments, the media guidance application may retrieve a social network profile of a user. The social network profile of a user may indicate a group of related social network profiles (e.g., associated with "friends" of a user). For example, the first user profile may indicate a second user profile by monitoring the communications of the first user with other users through the profile, receiving a listing of other users associated with the profile, and/or receiving a listing of other users with similar profiles who share an attribute with the first user. In some embodiments, the media guidance application may need additional information to gain access to the social network profile. For example, the media guidance application may receive input profile information such as username and password from the user in order to directly access functionality of the social network site through the social media server.

As used herein, a "social network," refers to a platform that facilitates networking and/or social relations among people who, for example, share interests, activities, backgrounds, and/or real-life connections. In some cases, social networks may facilitate communication among multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user. In such cases, classes of entities may correspond to the level of access and/or the amount or type of content associated with a first user that is accessible to a second user. As used herein, "social network content" refers to the content that is created, consumed, or posted by a user of a social network. The social network content may include status updates, microblog posts, images, graphic messages, etc. Social network content may be shared between users of the social network.

In some embodiments, the media guidance application may retrieve a user profile associated with a content source. The user profile associated with a content source may indicate a viewing history of media assets associated with the content source consumed by the user. The user profile may also include information about other users of the content source or other connected user profiles such as the social network profile of the user. For example, the media guidance application may retrieve the Netflix account of a user. The Netflix account may include separate viewing histories for each member of the household of the user, as well as linked social network profiles for each member of the household. The media application may retrieve each of these separate user profiles or may retrieve a single profile.

The media guidance application may monitor a second user profile, in which the second user profile indicates a plurality of media assets recently consumed by the second user. The monitoring of the user profile by the media guidance application may include requesting information from the server hosting the user profile at a regular interval, at a time designated by the user, or at the request of the user. Information requested may include recent posts, other profiles associated with the profile, other pages tagged by the user of the profile, and viewing history. For example, the media guidance application may, using information input by the user, access the social media server and receive social network content upon request. The media guidance application may store the social network content so that the media guidance application can follow activity and determine if content has been recently consumed.

In some embodiments, the monitoring of the user profile by the media guidance application may include capturing the content of a web page for analysis. For example, the media guidance application may include and/or have access to one or more content recognition modules. A content recognition module may use edge detection, pattern recognition, including, but not limited to, self-learning systems (e.g., neural networks), optical character recognition, online character recognition (including, but not limited to, dynamic character recognition, real-time character recognition, intelligent character recognition), and/or any other suitable technique or method to monitor a second user profile. For example, the media guidance application may detect that a second user posted a message on a social network account in the form of a video (e.g., an audio/video recording of a user). The video may include a series of frames. For each frame of the video, the media guidance application may use an object recognition module to identify objects in the frame. In some embodiments, the content recognition module or algorithm may also include audio analysis and speech recognition techniques, including, but not limited to, Hidden Markov Models, dynamic time warping, and/or neural networks (as described above) to process audio data and/or translate spoken words into text in order to identify objects. The media guidance application may then identify the media asset based on the identified object. For example, the media guidance application may cross-reference the object with the database listing objects and that correspond to particular media assets to identify the media asset.

In another example, the media guidance application may detect that a second user posted a textual message on a social network account. In response, the media guidance application may parse the textual message and cross-reference the phrases with a databased of possible media assets to determine if a media asset was mentioned. The media guidance application may implement machine learning techniques such as decision trees, statistical models, and neural networks to implement natural language processing, such as part-of-speech tagging, parsing, and topic segmentation and recognition, to allow for optimized understanding of the text. This may include a database of known language to cross-reference, such as titles of media assets, genres, and people associated with the media assets, as well as common descriptors of media assets to distinguish between a positive and negative mention.

In another example, the media guidance application may detect that a second user posted a media asset recommendation on a social network account. In response, the media guidance application may check a database of media assets that have been detected previously. If the media asset detected has not been mentioned previously, the media asset is considered a recently consumed media asset. If the media guidance application has monitored the consumption of the media asset in a separate incident, the media guidance application may still consider the recent consumption of the media asset as it is a separate incident of consumption. The media guidance application may distinguish among incidents of consumption by storing in a database the previously detected media assets and the method of detection.

In another example, the media guidance application may detect that a second user posted a microblog message. In response, the media guidance application may search the microblog post for indicia that the user recently consumed a media asset. For example, the media guidance application may analyze the text as described above to locate and identify any mention of a media asset in the microblog post. The detected media asset is then cross-referenced against the database of previously consumed media assets to determine if it is recently consumed. As referred to herein, the consuming of media assets can refer to watching, viewing, listening to, reading, and downloading the media assets. For example, the media guidance application may detect a user describing a television show that the user is watching on Netflix and then later detect downloading the same television show from the on-demand service of the cable company of the user. Both watching the television show on Netflix and downloading the television show from the on-demand service are examples of the consumption of the television show and are each separate incidents of consumption of the television show.

In yet another example, the media guidance application may detect new activity in a user profile associated with a content source. In response to detecting a new media asset in the viewing history, the media guidance application may cross-reference the new media asset to the database of the media assets viewed by the user. In the case that the user profile associated with the content source is connected to other users or other user profiles associated with other social networking sites, the media assets associated with these other accounts may also be included and monitored accordingly. The media guidance application may distinguish among the media assets detected through each method of monitoring and categorize the media assets accordingly or may add all the media assets to a list of media assets detected while monitoring without making any distinctions.

The media guidance application may determine whether to download a media asset of the media assets available for download based on whether or not the media asset corresponds to one of the plurality of media assets recently consumed by the second user. For example, the media guidance application may determine which available media assets were recently consumed by a friend of the user. The determination of the availability of a media asset for download is determined by the step discussed above. The determination of whether a media asset was consumed recently is partly included in the monitoring process discussed above, as during the monitoring process, the media guidance application will consider previous media assets detected by a user and determine if the media asset was recently mentioned by the user in the user profile. In some embodiments, the media guidance application may determine a specific time period (e.g., measured in minutes, hours, etc.) that determines whether or not a media asset was recently consumed.

In some embodiments, this time period may be set to a default and changed by the user. In response to the user providing a specific time period to consider recent, the media guidance application may store only the media assets that were consumed within the provided time window. Alternatively or additionally, the media guidance application may receive a predetermined time that determines whether or not a media asset was recently consumed from a remote source. For example, the predetermined time may be based on an industry standard, demographic information, and/or other information. In some cases, the predetermined time may be relative to a particular user. For example, the media guidance application may associate two different predetermined times for two different users based on the frequency at which each user consumes (or does not consume) media content.

In some embodiments, the media guidance application may determine what media assets to download and/or what other user profiles to monitor based on one or more criteria. For example, the media guidance application may determine whether or not to download a media asset only if a second user consumed the media within a predetermined amount of time. The predetermined amount of time may be set by default by the media guidance application or requested by the user. The predetermined amount of time indicates how to define "recently consumed" and so allows the media guidance application to ensure that the activity of the friend is still relevant to the interests of the user.

In some embodiments, the media guidance application may only monitor friends that are considered a certain threshold based on the electronic communication. For example, the media guidance application may determine whether or not to monitor a second user profile based on a level of electronic communication between the first user and the second user. As referred to herein, the "level of electronic communication" refers to the amount and/or frequency of electronic communication between the first user and the second user which can be used as an indication of the relationship between the first user and the second user and so the relationship among the media assets recently consumed by the second user and the current interests of the first user. The media guidance application may use the level of electronic communication to rank friends associated with the first user profile to determine which friends to check more frequently. The measure of level of electronic communication may be used to rank or prioritize the friends of the user. Electronic communication can include e-mail messages, text messages, microblog posts, posts to a social network web site page, and/or any other information. By measuring the amount and/or frequency of posts, e-mails, etc., the media guidance application may determine a particular level of friendship between the first user and the second user. This may take into account the overall amount or frequency of communication of the second user. For example, communications sent by a user that frequently communicates with other users may weigh less heavily in a determination of the friendship for that user than a user that does not frequently communicate with other users.

In some embodiments, the media guidance application may further determine a priority for downloading the media asset. For example, the priority may be based on a number of users that have consumed the media asset. The number of users that have consumed the media asset may indicate the level of interest in the media asset. The number of users may be compiled from all or a subset of the user profiles stored and monitored by the media guidance application. The subset may be selected by the media guidance application based upon a number of criteria set by the user or may be selected by the user. The users considered in the number of users may include friends of friends of the user or other users with profiles with similar attributes to the user profile of the user. The media guidance application may update the number of users who have recently consumed each media asset without storing information about each user or may store information about each user associated with each media asset. The media guidance application may include a threshold number of users which is set by default or specified by the user. For example, the media guidance application may ignore any media assets that have been consumed by fewer than five friends of the user as the user may prefer popular media assets. In another example, the media guidance application may ignore any media assets that have been viewed by more than thirty friends of the user as the media asset is likely to have already been recommended to the user.

In another example, the priority may be based on how recently the second user consumed the media asset. The media assets consumed more recently by the second user may be a stronger indication of the current interests of the first user and so a higher priority for download to the first device. For example, a media asset consumed by a second user in the last hour may be more heavily weighted than a media asset consumed a few days ago by the second user. The media guidance application may include a threshold which is set by default or specified by the user so that any media assets consumed before a threshold date or beyond a threshold time period are not considered.

In yet another example, the priority may be based on the cost of the media asset. The media guidance application may download any media assets under a specific threshold but require additional criteria before downloading any media assets above the threshold. For example, a media asset that costs five dollars may be more heavily weighted than a media asset that cost ten dollars as the user may have a preference for minimizing costs. The media guidance application may include a threshold cost which is set by default or specified by the user. For example, the media guidance application may ignore any media asset that costs more than fifteen dollars as the user may have a preference for minimizing cost. In another example, the media guidance application may ignore any media asset that costs less than three dollars as the user may consider cost as an indication of quality.

The priority for downloading the media asset may require a balance of multiple criteria mentioned, and so require a threshold number of users having recently consumed the media asset as well as a cost threshold. There may not be a specific threshold for all of the criteria but rather the media assets may be ranked based on the criteria such as cost, number of users and so on. In some embodiments, the media guidance application may download only media assets of above a rank set by the first user or download the media assets in order of rank. For example, the media guidance application may receive preferences from the user to download only media assets that cost less than five dollars and have been consumed by at least three friends in the last six months. In response to these preferences, the media guidance application may consider all of the criteria provided by the user to determine the media assets available for download. Additionally or alternatively, the media guidance application may receive, from the user, preferences to limit to downloading only ten media assets per day and to rank the media assets by number of friends who have consumed the media asset. In response to this rank requirement, the media guidance application may store the media assets in a sorted list by number of friends who have consumed the media asset and include a counter of how many media assets have been downloaded each day.

In some embodiments, the media guidance application may then download the media asset to the first device in response to determining that the media asset corresponds to the one of the plurality of media assets recently consumed by the second user. For example, in response to determining that an available media asset was recently consumed by a friend of the user, the media guidance application may automatically download the media asset to the device of the user. The media guidance application may consider user settings for factors such as certain time of day, connection to certain networks, bandwidth, or storage availability on the device before downloading. The user settings may be set to a default or may be set by the user. The media guidance application may also consider the limitation in number of downloads as described above. For example, the media guidance application may, as set by the user preferences, download only the top ten ranked media assets, as ranked by the user preferences, each evening at 6 pm.

In some embodiments, the media guidance application may determine whether or not the first user has consumed the media asset and in response to determining that the first user has consumed the media asset, not download the media asset to the first device. For example, the media guidance application may not download a media asset that the user has already consumed, despite another user recently consuming the media asset. The listing of media assets that the user has already consumed may be determined by the media assets previously downloaded, user profile viewing information or information received from the user. The media guidance application may have a default method to determine whether the user has already consumed the media asset or may receive the selected method to determine whether the user has already consumed the media asset from the user.

Figure 2:
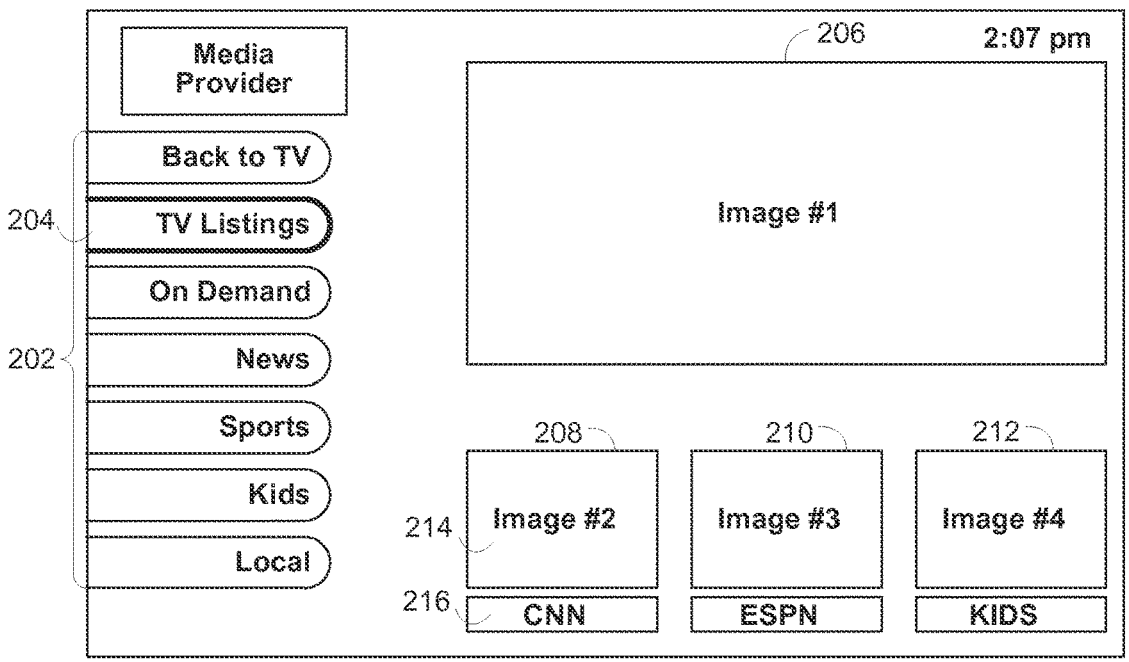
FIG. 2 shows another illustrative example of a media guidance display that may be presented in accordance with some embodiments of the disclosure.

In some embodiments, the media guidance application may receive a request from a user for a media asset recommendation based on media content recently consumed by a user. The media guidance application may receive such a request through one or more display screens such as those shown in FIGS. 1-2. FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider(e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content source or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
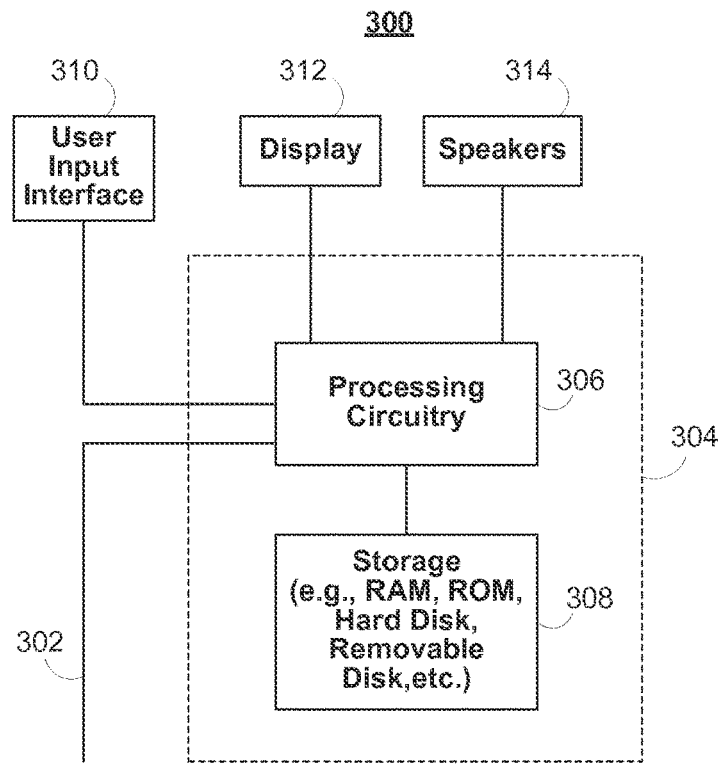
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in and MPEG-2 object carousel with the MPEG audio and video packets of a program.

Figure 4:
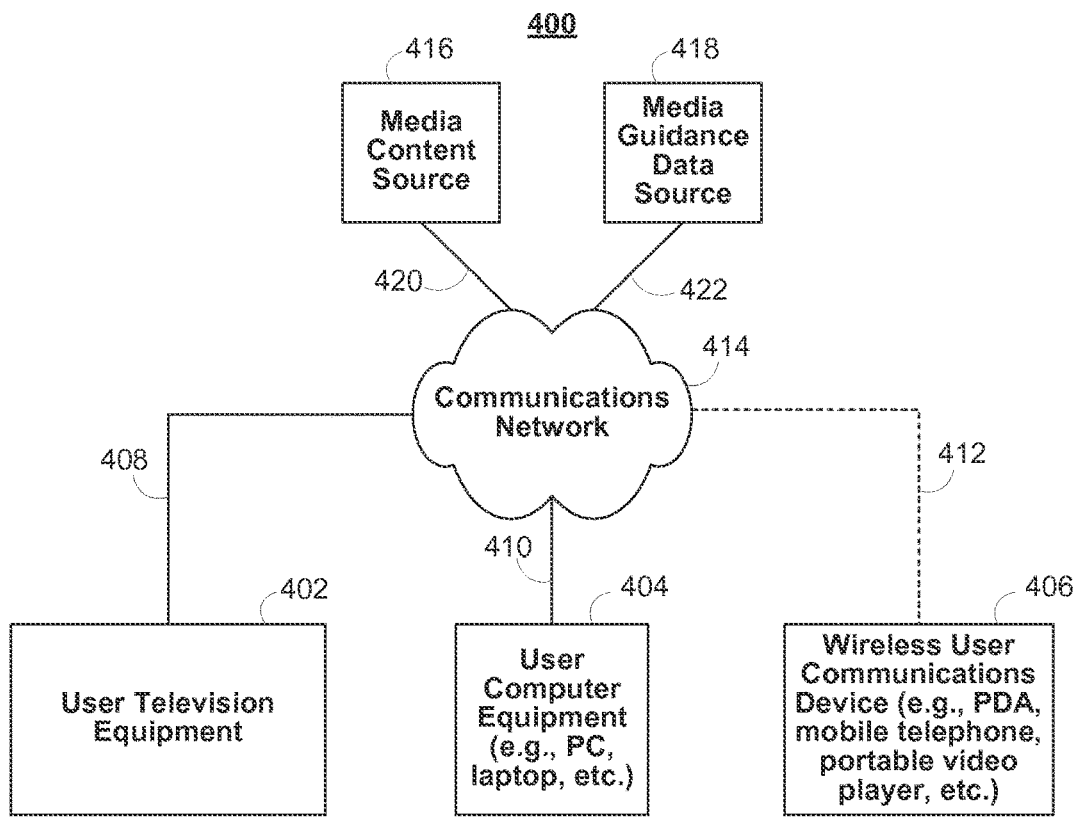
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed above.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a web site via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5 shows a flowchart of illustrative steps for determining media assets to download to a user device in accordance with some embodiments of the disclosure. It should be noted that process 500, or any step thereof, could be performed on, or provided by, any of the devices shown in FIGS. 3-4. For example, process 500 may be executed by control circuitry 304 (FIG. 3) as instructed by a media guidance application implemented on user equipment 402, 404, and/or 406 (FIG. 4) in order to determine media assets to download to a user device. In addition, one or more steps of process 500 may be incorporated into or combined with one or more steps of any other process or embodiment (e.g., process 600 (FIG. 6)).

At step 502, the media guidance application determines (e.g., via control circuitry 304 (FIG. 3)) media assets available for download to a first device in which the first device is related to a first user. For example, the media guidance application may store (e.g., at storage 308, media content source 416 (FIG. 4), media guidance data source 418 (FIG. 4), and/or any other location accessible via communications network 414 (FIG. 4)) a listing of media assets that fit the criteria set by the user (e.g., via user input interface 310) regarding downloadable media assets.

At step 504, the media guidance application retrieves (e.g., via control circuitry 304 (FIG. 3)) a first user profile on the first device, in which the first user profile indicates a second user related to the first user. For example, the media guidance application may retrieve (e.g., via control circuitry 304 (FIG. 3)) a social network profile of the user which indicates a group of related social network profiles. The media guidance application may store (e.g., at storage 308, media content source 416 (FIG. 4), media guidance data source 418 (FIG. 4), and/or any other location accessible via communications network 414 (FIG. 4)) the related social network profiles.

At step 506, the media guidance application monitors (e.g., via control circuitry 304 (FIG. 3)) a second user profile, in which the second user profile indicates a plurality of media assets recently consumed by the second user. For example, the media guidance application may regularly retrieve e.g., via control circuitry 304 (FIG. 3)) the related social network profiles and determine (e.g., via control circuitry 304 (FIG. 3)) if there has been new activity and media assets have recently been consumed.

At step 508, the media guidance application determines (e.g., via control circuitry 304 (FIG. 3)) whether to download a media asset of the media assets available for download based on whether the media asset corresponds to one of the plurality of media assets recently consumed by the second user. For example, the media guidance application may determine (e.g., via control circuitry 304 (FIG. 3)) which of the media assets available for download were recently consumed by the friend of the user.

At step 510, the media guidance application downloads (e.g., via control circuitry 304 (FIG. 3)) the media asset to the first device in response to determining (e.g., via control circuitry 304 (FIG. 3)) that the media asset corresponds to the one of the plurality of media assets recently consumed by the second user. For example, in response to determining that an available media asset corresponds to one of the media assets recently consumed by the friend of the user, the media guidance application may automatically download (e.g., via control circuitry 304 (FIG. 3)) the media asset to the user device.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 5.

Figure 6:
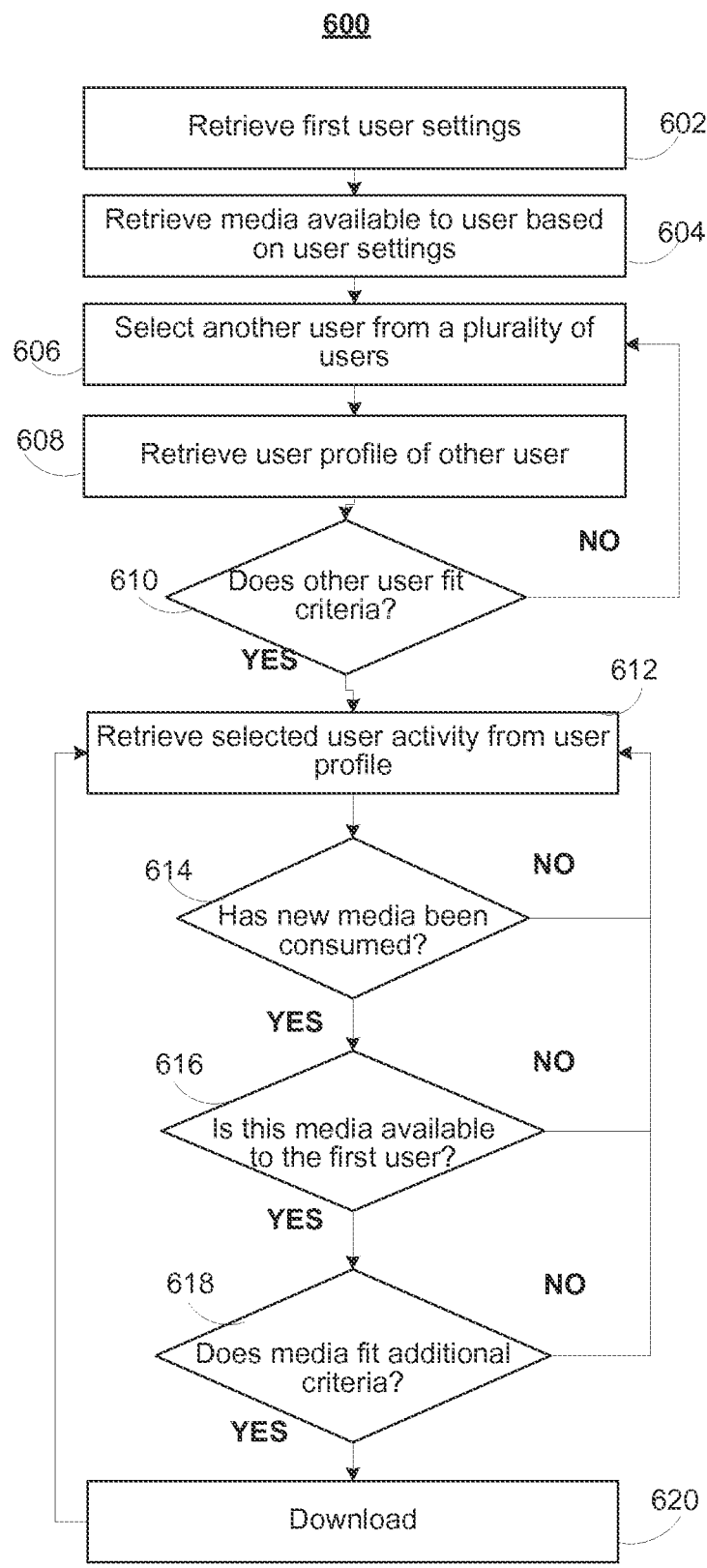
FIG. 6 is a flowchart of illustrative steps for determining media assets to download to a user device based on user-specific criteria in accordance with some embodiments of the disclosure.

FIG. 6 shows a flowchart of illustrative steps for determining media assets to download to a user device based on user-specific criteria in accordance with some embodiments of the disclosure. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to determine media assets to download to a user device based on user-specific criteria. In addition, one or more steps of process 600 may be incorporated into or combined with one or more steps of any other process or embodiment (e.g., process 500 (FIG. 5)).

At step 602, the media guidance application retrieves (e.g., via control circuitry 304 (FIG. 3)) first user settings which have been input by the user (e.g. via user input interface 310) and stored (e.g., at storage 308, media content source 416 (FIG. 4), media guidance data source 418 (FIG. 4), and/or any other location accessible via communications network 414 (FIG. 4)) by the media guidance application. For example, the media guidance application may retrieve (e.g., via control circuitry 304 (FIG. 3)) the preferences of the user to prioritize the download of media assets by number of users who have consumed the media asset, to only download anything under five dollars, to only download content from the cable company on demand service, and a social network profile which designates the list of friends to follow.

At step 604, the media guidance application retrieves (e.g., via control circuitry 304 (FIG. 3)) media assets available to the user based on the user settings. For example, the media guidance application may retrieve (e.g., via control circuitry 304 (FIG. 3)) a listing of downloadable media assets available through the content providers specified by the user.

At step 606, the media guidance application selects (e.g., via control circuitry 304 (FIG. 3)) another user from a plurality of users. For example, the media guidance application may retrieve (e.g., via control circuitry 304 (FIG. 3)) a listing of other users connected to the first user via the first user profile indicated in user settings.

At step 608, the media guidance application retrieves (e.g., via control circuitry 304 (FIG. 3)) the user profile of the selected other user. For example, the media guidance application may retrieve (e.g., via control circuitry 304 (FIG. 3)) the social network profile of the other user which has been connected to the social network profile of the first user.

At step 610, the media guidance application determines (e.g., via control circuitry 304 (FIG. 3)) if the other user fits criteria set by the first user profile. For example, the media guidance application may determine (e.g., via control circuitry 304 (FIG. 3)) the level of electronic communication between the first user and the other user and compare (e.g., via control circuitry 304 (FIG. 3)) the level of communication with the preferences of the first user. If the other user fits the criteria set by the first user, process 600 proceeds to step 612. Otherwise, process 600 proceeds to step 606.

At step 612, the media guidance application retrieves (e.g., via control circuitry 304 (FIG. 3)) the activity of the selected user from the indicated other user profile. For example, the media guidance application may update (e.g., via control circuitry 304 (FIG. 3)) a listing of media assets viewed by the user based on the user activity in the user profile and may store (e.g., at storage 308, media content source 416 (FIG. 4), media guidance data source 418 (FIG. 4), and/or any other location accessible via communications network 414 (FIG. 4)) the listing in a database.

At step 614, the media guidance application determines (e.g., via control circuitry 304 (FIG. 3)) whether new media assets have been consumed by the selected user. For example, the media guidance application may access (e.g., via control circuitry 304 (FIG. 3)) the listing of media assets that have been stored (e.g., at storage 308, media content source 416 (FIG. 4), media guidance data source 418 (FIG. 4), and/or any other location accessible via communications network 414 (FIG. 4)) in the database, and determine (e.g., via control circuitry 304 (FIG. 3)) if the activity from the user profile has changed since the user profile was last accessed to indicate recent consumption of media assets. If the new media assets have been consumed by the selected user, process 600 proceeds to step 616. Otherwise, process 600 proceeds to step 612.

At step 616, the media guidance application determines (e.g., via control circuitry 304 (FIG. 3)) if the media asset is available to the first user. For example, the media guidance application may compare (e.g., via control circuitry 304 (FIG. 3)) the listing of recently consumed media assets and the listing of media assets available for download to determine (e.g., via control circuitry 304 (FIG. 3)) which media asset fits all criteria. If the media asset is available to the first user, process 600 proceeds to step 618. Otherwise process 600 proceeds to step 612.

At step 618, the media guidance application determines (e.g., via control circuitry 304 (FIG. 3)) if the media asset fits any of the additional criteria as specified by the first user in the user settings. For example, the media guidance application may compare (e.g., via control circuitry 304 (FIG. 3)) the media asset to additional criterion such as cost, number of users, or priority of download as indicated through user settings. If the media asset fits any of the additional criteria as specified by the first user in the user settings, process 600 proceeds to step 620. Otherwise, process 600 proceeds to step 612.

At step 620, the media guidance application downloads (e.g., via control circuitry 304 (FIG. 3)) the media assets to the user device. For example, the media guidance application may automatically download (e.g., via control circuitry 304 (FIG. 3)) the media asset to the user device. Process 600 proceeds to step 612.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for determining media assets to download, the method comprising:
   determining media assets available for download to a first device, wherein the first device is related to a first user;
   retrieving a first user profile on the first device, wherein the first user profile indicates a second user is related to the first user;
   retrieving a second user profile associated with the second user to identify from the second user profile a plurality of media assets recently consumed by the second user;
   determining a subset of the plurality of media assets recently consumed by the second user;
   storing a count of a number of users having recently consumed the subset;
   updating the count of the number of users in response to determining the second user recently consumed the subset;
   comparing the updated count of the number of users having recently consumed the subset to a first threshold number of users to determine whether the subset has been consumed by the first threshold number of users, wherein the first threshold number of users is greater than one;
   comparing the updated count of the number of users to a second threshold number of users to determine whether the subset has been consumed by less than the second threshold number of users, wherein the second threshold number of users is greater than the first threshold number of users; and
   in response to determining that (1) the subset has been consumed by the first threshold number of users, (2) the subset has not been consumed by the second threshold number of users, and (3) a media asset of the media assets available for download to the first device corresponds to one of the media assets in the subset, automatically downloading the media asset to the first device.

2. A system for determining media assets to download, the system comprising:
   storage circuitry configured to store a first user profile associated with a first user, wherein the first user profile indicates a second user is related to the first user; and
   control circuitry configured to:
   determine media assets available for download to a first device, wherein the first device is related to the first user;
   retrieve a second user profile associated with the second user to identify from the second user profile a plurality of media assets recently consumed by the second user;
   determine a subset of the plurality of media assets recently consumed by the second user;
   store a count of a number of users having recently consumed the subset;

update the count of the number of users in response to determining the second user recently consumed the subset;

compare the updated count of the number of users having recently consumed the subset to a first threshold number of users to determine whether the subset has been consumed by the first threshold number of users, wherein the first threshold number of users is greater than one;

compare the updated count of the number of users to a second threshold number of users to determine whether the subset has been consumed by less than the second threshold number of users, wherein the second threshold number of users is greater than the first threshold number of users; and in response to determining that (1) the subset has been consumed by the first threshold number of users, (2) the subset has not been consumed by the second threshold number of users, and (3) a media asset of the media assets available for download to the first device corresponds to one of the media assets in the subset, automatically download the media asset to the first device.

3. The method of claim 1, wherein identifying from the second user profile the plurality of media assets recently consumed by the second user comprises monitoring social media network content corresponding to the second user.

4. The method of claim 1, wherein identifying from the second user profile the plurality of media assets recently consumed by the second user comprises receiving information related to the plurality of media assets recently consumed by the second user from a content source.

5. The method of claim 1, wherein the subset of the plurality of media assets comprises at least two media assets, and the method further comprises determining a priority for automatically downloading the at least two media assets based on the number of users that have consumed each of the at least two media assets, respectively.

6. The method of claim 1, wherein the subset of the plurality of media assets comprises at least two media assets, and the method further comprises determining a priority for automatically downloading the at least two media assets based on which of the at least two media assets was more recently consumed by the second user.

7. The method of claim 1, wherein identifying the plurality of media assets recently consumed by the second user comprises identifying media assets consumed by the second user within a predetermined amount of time.

8. The method of claim 1, further comprising:
determining whether the first user has consumed the media asset; and
in response to determining that the first user has consumed the media asset, not downloading the media asset to the first device.

9. The method of claim 1, wherein determining the media assets available for download to the first device comprises comparing the media assets against a criterion set by the first user in the first user profile.

10. The system of claim 2, wherein the control circuitry is configured to identify from the second user profile the plurality of media assets recently consumed by the second user by monitoring social media network content corresponding to the second user.

11. The system of claim 2, wherein the control circuitry is configured to identify from the second user profile the plurality of media assets recently consumed by the second user by receiving information related to the plurality of media assets consumed by the second user from a content source.

12. The system of claim 2, wherein the subset of the plurality of media assets comprises at least two media assets, and the control circuitry is further configured to determine a priority for automatically downloading the media asset based on the number of users that have consumed each of the at least two media assets, respectively.

13. The system of claim 2, wherein the subset of the plurality of media assets comprises at least two media assets, and the control circuitry is further configured to determine a priority for downloading the media asset based on which of the at least two media assets was more recently consumed by the second user.

14. The system of claim 2, wherein the control circuitry is configured to identify the plurality of media assets recently consumed by the second user by identifying media assets consumed by the second user within a predetermined amount of time.

15. The system of claim 2, wherein the control circuitry is further configured to:
determine whether the first user has consumed the media asset; and
in response to determining that the first user has consumed the media asset, not download the media asset to the first device.

16. The system of claim 2, wherein the control circuitry is configured to determine the media assets available for download to the first device by comparing the media assets against a criterion set by the first user in the first user profile.

17. The method of claim 1, wherein the subset of the plurality of media assets comprises at least two media assets, and the method further comprises determining a priority for automatically downloading the at least two media assets based on respective costs of the at least two media assets.

18. The method of claim 1, wherein determining the media assets available for download to the first device comprises comparing the media assets against a criterion of the first user profile.

19. The system of claim 2, wherein the subset of the plurality of media assets comprises at least two media assets, and the control circuitry is further configured to determine a priority for automatically downloading the at least two media assets based on respective costs of the at least two media assets.

20. The system of claim 2, wherein the control circuitry is configured to determine the media assets available for download to the first device by comparing the media assets against a criterion of the first user profile.

* * * * *